United States Patent [19]

Sharps, Jr.

[11] Patent Number: 4,496,413
[45] Date of Patent: Jan. 29, 1985

[54] METHOD OF FORMING A BLOCKED CROSS-PLIED POLYMER FILM

[75] Inventor: Gordon V. Sharps, Jr., Fairport, N.Y.

[73] Assignee: Mobil Oil Corporation, New York, N.Y.

[21] Appl. No.: 474,658

[22] Filed: Mar. 11, 1983

[51] Int. Cl.³ .............................................. B29D 23/04
[52] U.S. Cl. ........................ 156/244.13; 156/244.14; 156/244.27
[58] Field of Search ............... 156/244.13, 244.14, 156/244.23, 244.24, 244.27; 264/176 R; 425/133.1, 131.1, 465

[56] References Cited

U.S. PATENT DOCUMENTS

| 3,051,989 | 9/1962 | Mercer | 425/465 |
| 3,853,661 | 12/1974 | Sudo | 156/244.14 |
| 3,862,878 | 1/1975 | Azuma | 156/244.15 |
| 4,011,128 | 3/1977 | Suzuki | 156/244.13 |
| 4,358,330 | 11/1982 | Aronovici | 156/244.14 |

FOREIGN PATENT DOCUMENTS 904525 7/1972 Canada .......................... 425/133.1

Primary Examiner—Caleb Weston
Attorney, Agent, or Firm—Alexander J. McKillop; Michael G. Gilman; Charles J. Speciale

[57] ABSTRACT

A method is disclosed for forming a blocked cross-plied polymer film by extruding a polymer melt through a tubular rotary die to impart a molecular orientation of the polymer in the transverse (TD) direction during extrusion, expanding the film, and then blocking it by pressing opposing walls together to produce a film in which at lease two layers thereof have transverse molecular orientations which cross to form a balanced cross-plied film.

5 Claims, 8 Drawing Figures

METHOD OF FORMING A BLOCKED CROSS-PLIED POLYMER FILM

BACKGROUND OF THE INVENTION

1. Field of the Invention

The present invention relates to a method for forming a blocked cross-plied polymer film. More particularly, it relates to a tubular extrusion and blocking method which produces a polymer film having a reduced machine direction (MD) orientation and an increased transverse direction (TD) orientation of the polymer molecules in two extruded layers, with the transverse direction orientation of the molecules of one layer of the film crossing the transverse direction orientation of the molecules of another layer of the film to produce a balanced cross-plied film.

2. Discussion of the Prior Art

Generally, when a single-layer or laminated plastic film is formed, for example of a high density polyethylene, it is extruded from a tubular extrusion die having stationary die lips. The extruded film is primarily unbalanced as the molecules of the polymer melt are principally oriented in a longitudinal direction of the film, commonly called the machine direction (MD). The molecular orientation in the transverse direction of the film is low. As a result, the resulting film has low strength to stresses applied in a direction deviating from the machine direction of the film.

In order to improve the physical strength and characteristics of an extruded film, attempts have been made to reduce the unbalanced film orientation by achieving a greater transverse direction molecular orientation and a reduced machine direction molecular orientation in the extruded film so as to achieve a better balance of the two.

Generally, transverse direction orientation of the molecules can be produced to some degree by blowing the film after extrusion thereby stretching it in a transverse direction. However, the limits to which a film can be expanded, the socalled blow up ratio (BUR), without breaking or becoming too thin severely limits the amount of transverse orientation which can be imparted during the expansion process.

Attempts have been made to achieve a balanced cross plied structure in the wall of an extruded film by rotating an entire die during extrusion of a film. This technique is disclosed in U.S. Pat. No. 4,358,330. While this technique has some merits in producing a transverse molecular orientation which can be further enchanced during expansion of the film, the die and supporting apparatus which are required are complex and expensive to build and maintain. Moreover, since the molecular orientation imparted by die rotation takes place outside the die, this too limits the amount of transverse direction orientation which can be obtained, as any such orientation must be done before the film frost line is reached. Furthermore, excessive twisting of the thermoplastic melt will cause the tubular film to collapse, making it difficult to implement this type of orientation technique.

It has also been attempted to bond separate film layers together each having different molecular orientation patterns in order to produce a resultant film of desired structural characteristics. This method does not use in-line techniques since the film layers are separately produced and processed and then bonded together. Since the process is not in-line, it requires additional processing and handling of the film layers which is costly and undesirable.

SUMMARY OF THE INVENTION

The present invention has been designed to overcome the foregoing problems.

One object of the invention is to provide a method for forming a polymer film which has at least two layers in which the molecular directional orientation of one layer crosses that of the other layer to provide a cross-plied film structure having improved strength properties.

Another object of the invention is to provide a method for producing a cross-plied film structure which is completely in line and which does not require out of line processing steps.

These and other objects, features and advantages of the invention will be more readily perceived from the following detailed description of the invention which is provided in connection with the accompanying drawings.

DETAILED DESCRIPTION OF THE INVENTION

Figure 1:
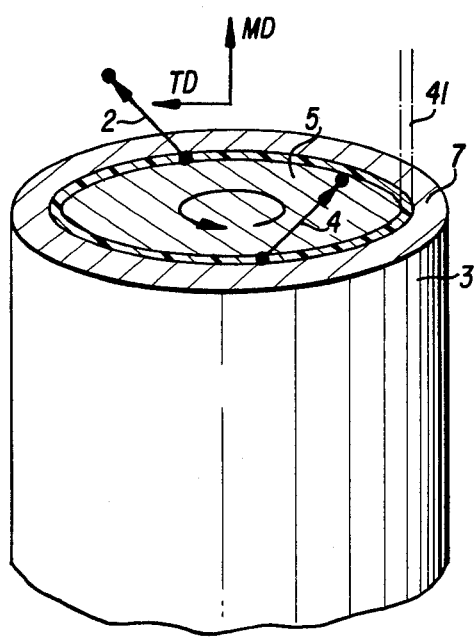
FIG. 1 is a schematic representation of a rotary tubular extrusion die which explains a principal feature of the method of the invention.

FIG. 1 illustrates a schematic representation of a rotary die 3 and, more particularly, an interior annular flow passage 41 defined by an inner die part 5 which is rotatable relative to an outer die wall 7. The annular extrusion passage 41 defined by the inner die part 5 and outer die wall 7 terminates in an extrusion gap. The rotation of inner die part 5 imparts a molecular orientation to a film as it passes through the die and before it reaches the extrusion gap. The directional component of this molecular orientation is illustrated by arrows 2 and 4. Although for simplicity the directional components 2 and 4 are drawn above the portion of the die illustrated in FIG. 1, it should be appreciated that actual molecular orientation in the illustrated directions occurs as the melt flows through the annular extrusion passage 41. A tubular film extruded through rotary die 3 will have a TD/MC orientation which is more balanced than if the extrusion were effected through a completely stationary die. The TD/MD balance can be regulated by regulating the RPM of inner die part 5 and the speed of machine direction extrusion, which in turn controls the amount of transverse direction molecular orientation of the extruded melt. Additional TD molecular orientation can then be imparted during conventional blown expansion of the film by a gas pressure subsequent to extrusion.

In the invention, a rotary die, as schematically represented by FIG. 1, is utilized to impart the desired transverse direction orientation to an extruded film. The extruded film is then blocked by pressing and adhering opposing walls of the film together to yield a cross-plied film.

Figure 5:
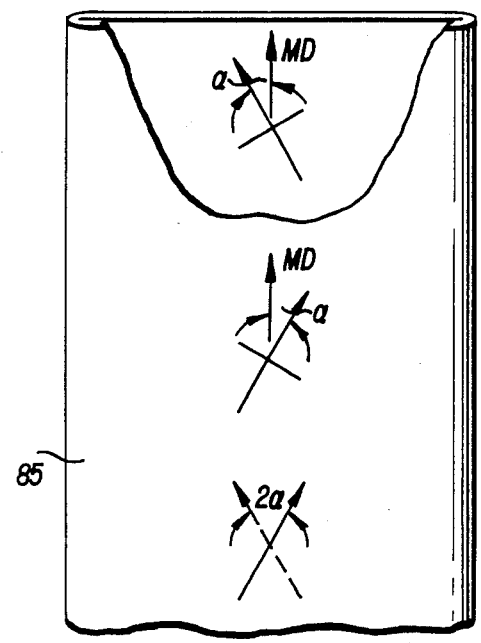
FIG. 5 illustrates an extruded expanded polymer film, prior to blocking.

The film which is extruded by the FIG. 1 die is shown in greater detail in FIG. 5, wherein opposing walls of the film have transverse direction orientations crossing one another.

Figure 6:
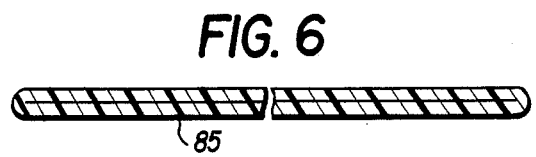
FIG. 6 illustrates a two layer cross-plied polymer film produced in accordance with the teachings of the invention.
Figure 4:
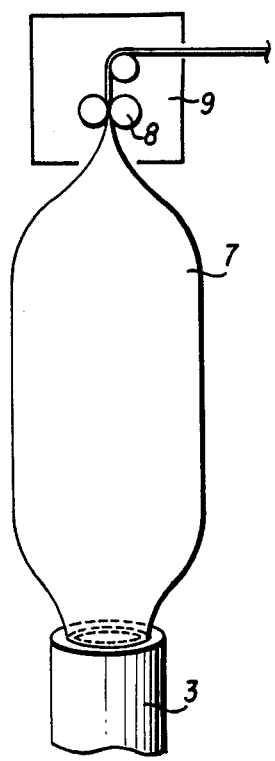
FIG. 4 illustrates the overall method employed in the invention.

FIG. 4 illustrates the overall extrusion and blocking performed in accordance with the teachings of the invention. The film extruded through rotary die 3 is expanded by a conventional pressurized gas blowing technique and is then blocked by means of a blocking station 9 which contains a pair of nip rolls 8 for pressing opposing walls of the tubular extrusion together. If the walls of the extruded polymer have sufficient adhesion characteristics, the resulting film from the blocking station has two layers which are integrally connected, as shown in FIG. 6, with each layer having an orientation pattern in the transverse direction which crosses that of the other, as clearly illustrated in FIG. 5.

The blocked film has a unified cross-plied structure which provides an improved static property to the film while also sufficiently improving its high speed tear properties resulting in resistance to puncture and tears. This can be varied by adjusting the adhesion quality between the walls and by the relative rpm of the rotating member. The overall film has an enhanced toughness, strength and puncture resistance over conventional tubular extruded films, and can be formed into high strength bags by overlapping two layers of the blocked cross-plied film and heat sealing them together.

Figure 7:
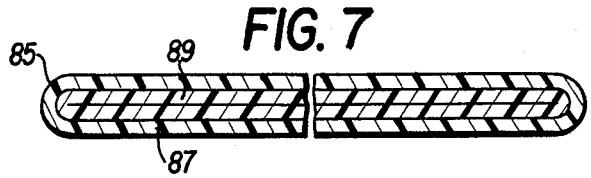
FIG. 7 illustrates a four layer cross-plied polymer film produced in accordance with the teachings of the invention; and, FIG. 8 illustrates a six layer cross-plied polymer film produced in accordance with the teachings of the invention.

If the extruded polymer does not have sufficient self-adhesion to allow blocking to occur, the extrusion through die 3 may be of a two or more layer laminate with the inner layer of the extruded tubular film being an adhesive layer so that the nip rolls of the blocking station 9 press the adhesion layers together to form the resultant blocked cross-plied film structure. FIG. 7 illustrates a blocked structure having an inner layer 89 formed of an adhesive material. Typical adhesive materials which may be used include ethylvinylacetate, ethyleneproplyene rubber, polybutadiene and Surlyn (T.M. Dupont Chem. Co.). Typical materials which can be used as the outer extruded layers include polyethylene, polyproplyene and polystyrene.

Figure 8:
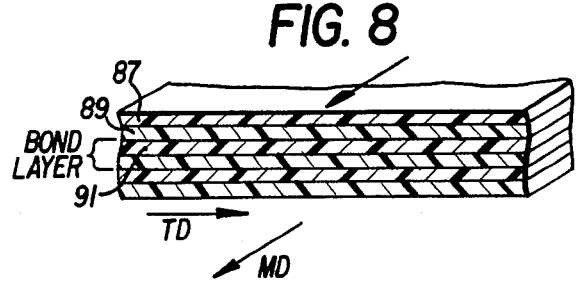

FIG. 8 illustrates a six layer film which may be produced in which the inner two layers are formed of an adhesive material which bonds to itself and to a surrounding thermoplastic layer.

Figure 2:
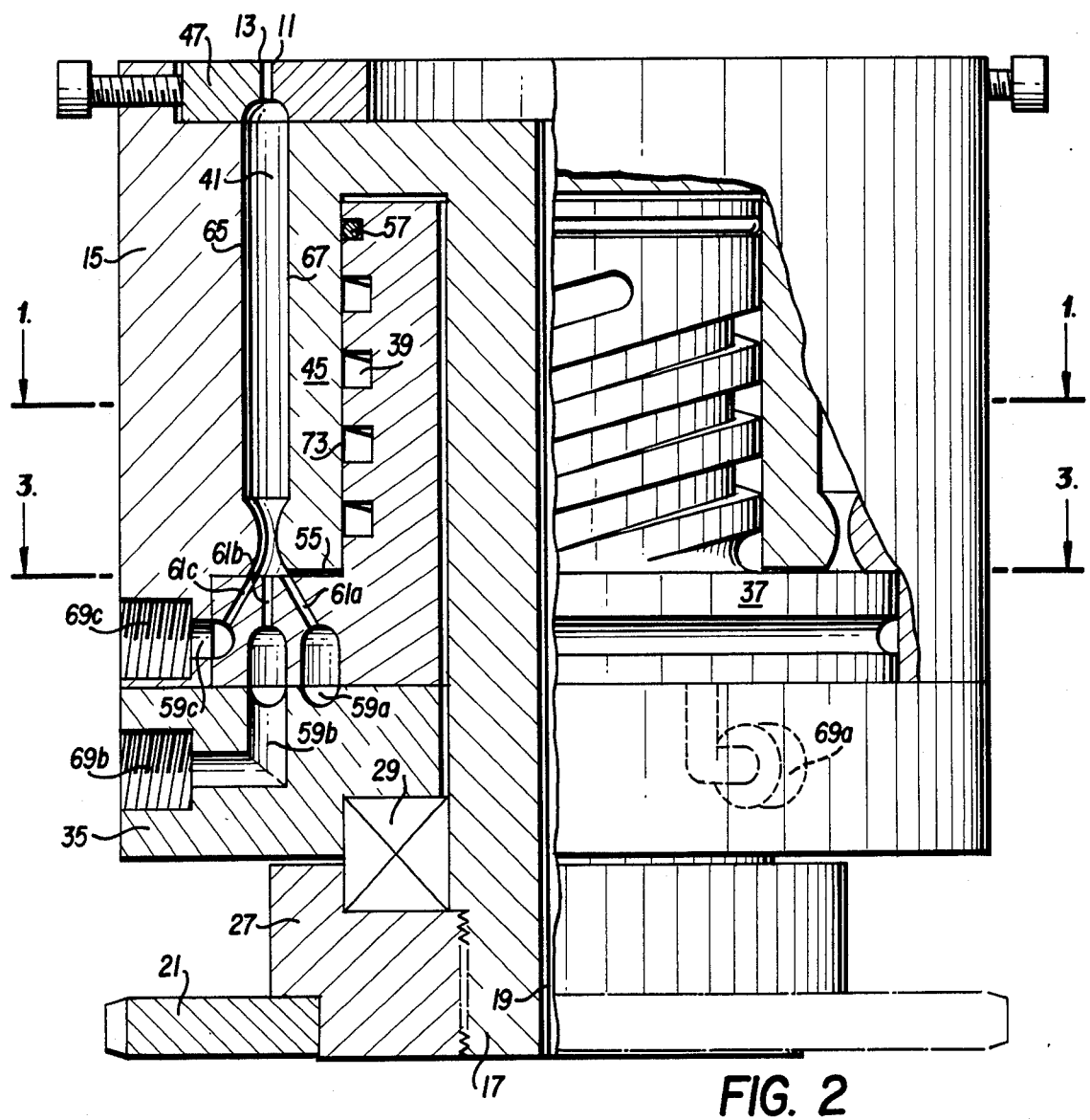
FIG. 2 is a side sectional view of a die which can be used in practicing the teachings of the invention.
Figure 3:
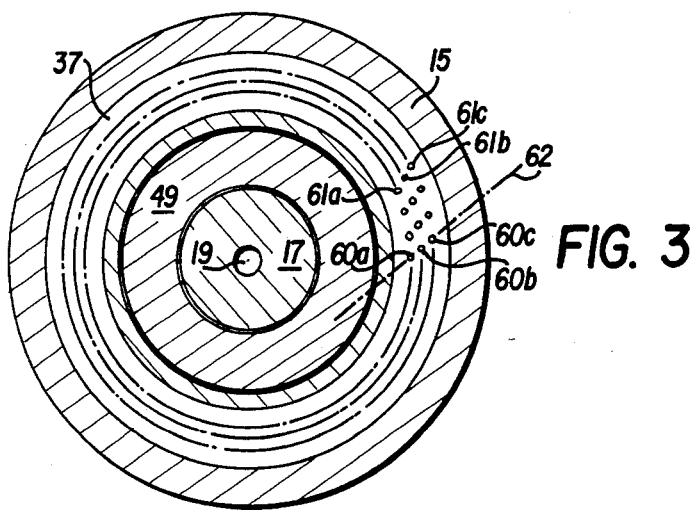
FIG. 3 illustrates a sectional view of along the lines 3—3 of the die shown in FIG. 2.

A suitable die which can be used to create the tubular extrusion which is blocked to form the FIG. 8 film is shown in FIGS. 2 and 3 of the application.

This die includes structures for forming three layers of polymer, which may be similar or dissimilar, in an annular extrusion passage 41 so that the extruded film has a layered wall structure. If all polymer melts are the same, the extrusion would effectively be one uniform layer of the same polymer. However, the die illustrated in FIG. 2 could also be used so that an inner melt layer is adhesive to facilitate later blocking of the extruded and expanded film.

The construction of the die illustrated in FIGS. 2 and 3 will now be described.

The die includes an outer die body 15 having an interior peripheral wall 65 which defines one side of an annular flow passage 41. The other side of annular flow passage 41 is formed by an outer peripheral surface 67 of a rotary wall 45. The annular flow passage 41 terminates at a die orifice formed by an inner die lip 11 and an outer die lip 13 respectively provided at the rotary wall 45 and outer die body 15.

A thermoplastic polymer melt is introduced into the annular flow passage 41 by a plurality of annular melt inlet passages 59a, 59b and 59c. These annular melt inlet passages are formed in a distribution plate 35 and a melt seal/distribution block 37 and are respectively connected to melt inlet orifices 69a, 69b and 69c.

The polymer melt flows into the annular flow passage 41 from the annular melt inlet passages 59a, 59b and 59c through respective groups of holes 61a, 61b and 61c provided in the melt seal/distribution block 37. These holes, which have openings into annular flow passage 41 equally spaced in each group, are shown in greater detail in FIG. 2. Each group of holes, e.g. 61a, is on a fixed common radius from the die axis. The different groups of holes 61a, 61b and 61c are each on a different radius, as shown in FIG. 2. In addition, the holes of one group are shifted in a circumferential direction, i.e. radially offset, relative to the holes of another group, so that respective holes 60a, 60b, 60c from all three groups align on line 62, as illustrated in FIG. 3.

The arrangement of the groups 61a, 61b and 61c of holes in the melt distribution block 37 causes polymer melts respectively introduced at inlet orifices 69a, 69b and 69c to be layered in the annular flow passage 41 to thus form a layered co-extrusion of the melts. The manner in which this layering is achieved, and the manner in which it is affected by die rotation, will be described in greater detail below.

Distribution plate 35 includes a bearing 29 which provides thrust support and radial location of a rotary wall input shaft 17.

The die further includes the rotary wall input shaft 17 in which is formed a gas passage 19 which extends throughout the entire axial length of the die. Gas passage 19 is used to blow and expand an extruded polymer film, as well known in the art.

A sprocket 21 is attached to the rotary wall input shaft 17 so that the former drives the latter in rotation. A suitable driving source (not shown) is coupled to sprocket 21 by means of a driving chain.

A bearing retainer 27 is provided which supports both the bearing 29 and the sprocket 21. Driving movement of shaft 17 by rotation of sprocket 21 in turn causes rotation of rotary wall 45.

The stationary melt seal/distribution block 37 which surrounds shaft 17 is connected with the distribution plate 35. The melt seal/distribution block 37 has a cylindrical upper portion which has on its outer circumferential periphery a screw thread 39 forming flight channels of an extruder-type seal. The other part of the extruder type seal is formed by the inner peripheral surface 73 of the rotary wall 45. The screw threads 39 and wall 73 are arranged such that rotation of rotary wall 45 by drive shaft 17 causes an extruder effect which forces any polymer melt tending to escape from the annular flow passage 41 through a gap 55 existing between the bottom of rotary wall 45 and top of melt seal/distribution block 37 back into the annular flow passage 41. The extruder-type seal is highly effective in preventing loss of polymer melt even when it is under considerably high pressure.

A die orifice adjustment ring 47 is provided which is fixed to the outer die body 15 and and which is adjustable in position to properly set the width existing between the inner die lip 11 and outer die lip 13 about the entire die orifice.

As noted, the holes which are provided in the melt seal/distribution block 37 open into the annular flow passage 41 in the manner illustrated in FIG. 2. Each group of holes is respectively fed from one of the annular melt inlet passages 59a, 59b and 59c which are connected to respective melt inlet orifices 69a, 69b or 69c. As a result, different polymer streams respectfully emanate from each of the groups of holes 61a, 61b and 61c. This causes a layering of the polymer streams in the annular flow passage 41. If rotation is imparted to rotary wall 45, the respective polymer streams will be uniformly distributed in flow passage 41 circumferentially of the die, but will form individual layers within annular flow passage 41. As a result, an extruded polymer film is produced having a number of layers of uniformly distributed melt corresponding to the number of melt streams introduced into annular flow passage 41. In the die illustrated in FIG. 1, three such flow streams will be present; however, it should be appreciated by those skilled in the art that the number of flow streams (hole groups and annular flow paths) may be reduced or increased depending on the layering effect desired in the extruded film.

It is found that even a moderate degree of rotation of rotary wall input shaft 17, e.g., approximately 2 RPM, is sufficient to produce a uniform layering of the polymer streams in the extruded film.

Because a uniform layering of the melt streams is produced upon rotation of the rotary wall 45, the layer ratios or thickness of the extruded polymer streams can be controlled solely by the flow rates of the polymer streams through the melt inlet orifices 69a, 69b and 69c. Additional, complex, internal die structures are not required to regulate layer thickness or distribute a melt circumferentially.

The melt pressure in gap 55 which serves to load bearing 29 also has a tendency to cause melt to be squeezed out of the die and into the space between the stationary support member 49 and the inner peripheral surface 73 of rotary wall 45. If high melt pressures are involved, this would be a difficult leakage path to seal. To seal this path, an extruder-type seal is employed with the screw threads 39 provided on the outer peripheral surface of melt seal/distribution block 37 cooperating with the rotating inner peripheral surface 73 of the rotary wall 45. The inner peripheral surface, in effect, acts as the barrel of an extruder during rotation forcing any melt in the area between the stationary block 37 and movable wall 45 back through gap 55 and toward the annular flow passage 41.

As is apparent from the foregoing description, when the FIG. 2 die is used with wall 45 rotating and the resulting extrusion is expanded and then blocked by nip rolls 8, a blocked cross-plied polymer film is produced in an in-line operation, without requiring any further processing steps. The method is simple and may be used with presently existing blowing and blocking structures without requiring a considerable increase in equipment cost or expense. The resulting film produced by the method has improved structural characteristics which are not obtainable with a usual tubular extrusion of a polymer melt. Moreover, a lower blow-up ratio (BUR) can be used to impart a desired transverse direction molecular direction orientation to the film due to the molecular orientation produced during extrusion.

While a preferred embodiment of a method of forming a blocked cross-plied polymer film has been described, it should be apparent that many modifications can be made to the invention without disparting from the spirit and scope thereof. Accordingly, the invention is not limited by the foregoing description, but is only limited by the scope of the claims appended hereto.

I claim:

1. A method of manufacturing a polymer film comprising the steps of:
   extruding at least one layer of polymer through a tubular die having inner and outer die walls defining an annular extrusion passage which terminates at an annular die gap;
   rotating at least one of the die walls relative to the other to produce orientation of polymer molecules in the transverse direction in the extruded film;
   feeding the extruded tubular film to a blocking means; and,
   blocking the extruded film with said blocking means to produce a cross-plied layered film in which the transverse direction molecular orientation of one layer crosses the transverse direction molecular orientation of the other layer.

2. A method as in claim 1 further comprising the step of expanding the extruded film by means of a gas pressure prior to feeding it to said blocking means.

3. A method as in claim 1 wherein said outer die wall is stationary and said inner die wall is rotated to produce said orientation of polymer molecules.

4. A method as in claim 1 wherein at least two layers of polymer melt are extruded through said tubular die, one of said layers, which is extruded adjacent to the inner lip of said die, having properties permitting adhesion to itself in said blocking step.

5. A method as in claim 1 further comprising the steps of overlapping a pair of cross-plied layered films and heat sealing them together to produce bags.

* * * * *